Aug. 13, 1968     R. CHARLES ET AL     3,397,182
POLYOXYMETHYLENE-TYPE RESINS AND PROCESS FOR THEIR PRODUCTION
Filed April 15, 1965     3 Sheets-Sheet 1

Aug. 13, 1968    R. CHARLES ET AL    3,397,182
POLYOXYMETHYLENE-TYPE RESINS AND PROCESS FOR THEIR PRODUCTION
Filed April 15, 1965    3 Sheets-Sheet 3
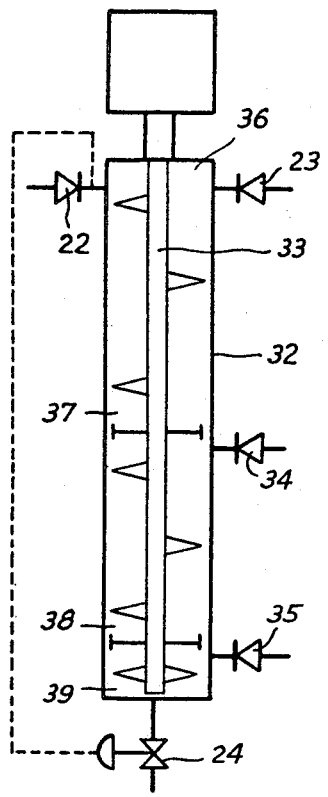
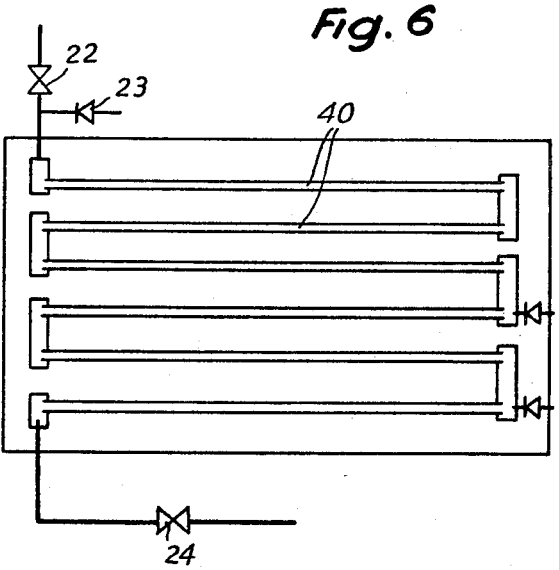
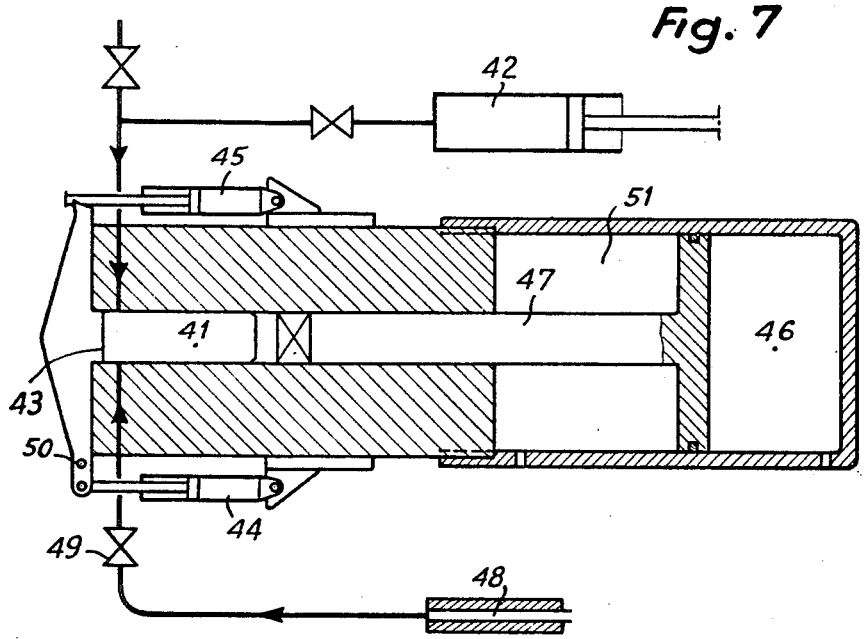

United States Patent Office 3,397,182
Patented Aug. 13, 1968

3,397,182
POLYOXYMETHYLENE-TYPE RESINS AND PROCESS FOR THEIR PRODUCTION
Robert Charles, Lens, and Paul Le Brasseur, Bully-les-Mines, France, assignors to Ethylene-Plastique, Paris, France, a French society
Filed Apr. 15, 1965, Ser. No. 448,504
Claims priority, application Great Britain, Apr. 22, 1964, 16,660/64
5 Claims. (Cl. 260—67)

ABSTRACT OF THE DISCLOSURE

Polyoxymethylene resins are formed by heating a charge consisting essentially of a cyclic aldehyde compound, particularly trioxane, in the presence of a catalyst at a temperature above 130° C. and at a pressure of at least 200 atmospheres.

---

Figure 1:
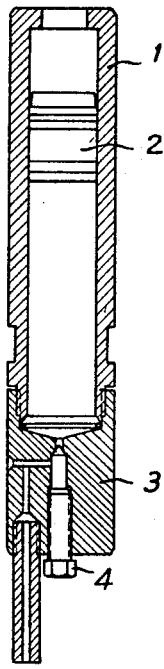

This invention is concerned with polyoxymethylene-type resins and with a process for their production.

The industrial production of polyoxymethylene-type resins has been known since 1942. The numerous patents which have appeared since then show that the production of these resins takes place in three stages, (1) the polymerisation properly so-called, (2) the stabilisation with respect to heat, and (3) the stabilisation with respect to oxygen and acids. Polyoxymethylenes manufactured from anhydrous formaldehyde or its trimer, trioxan, depolymerise rapidly under the action of a number of factors, namely; depolymerisation of the ends of the chains, for which the terminal hydroxyl groups are responsible; cleavage of the main chain by auto-oxidation and degradation by the secondary products of auto-oxidation; thermal degradation which breaks the macromolecule; or acidolysis which also breaks the macromolecule. It may therefore be said that, in general, the degradation of polyoxymethylenes takes place in two ways: (i) thermal degradation, depolymerisation of the chain ends and cleavage of the macromolecule, or (ii) degradation by oxidising attack and/or acid attack (the acid can be the formic acid formed by the liberated formaldehyde and atmospheric oxygen).

In order to reduce this double instability, the crude resin is subjected to a chemical transformation which has the object of fixing the chain ends and thus considerably reducing thermal degradation. The blocking of the chain ends is effected by esterification, etherification, reaction with isocyanates or the like, and the thermal instability can also be reduced by the introduction of units of another monomer into the polymer chain.

The resin thus modified is then mixed with antioxidants and basic organic compounds (amides, urea, hydrazides, polyamides, polyurea, polythiourea, poly-N-vinyl-lactams, polyvinylamides, and the like), which provide it with a better resistance to oxygen, oxidising agents, hydrolysis and acidolysis.

However, the chemical conversion step (esterification, etherification, reaction with isocyanates, etc.) is difficult and costly on an industrial scale and is the more so, the more unstable is the crude polyoxymethylene obtained from the polymerisation. Crude polyoxymethylenes, when treated with the various chemical reagents at rather elevated temperatures, always have a tendency to degrade and the less stable the starting material, the more apparent is this degradation. It is therefore industrially advantageous either to obtain a crude resin which is sufficiently stable to withstand the further chemical transformations without degradation or to carry out the polymerisation and stabilisation reactions simultaneously in order to avoid a difficult industrial operation.

In view of this, we have considered effecting the polymerisation at very elevated temperatures. However, the literature shows that one is limited in this direction by the existence of the "temperature ceiling" for polymerisation. The most recent studies have shown that in the polymerisation of aldehydes, there exists a "temperature ceiling" which is defined as being "the isokinetic temperature at which the reaction tends to lead to polymerisation or to lead to depolymerisation with the same number of chances." The calculated ceiling temperature for polyoxymethylene has been found to be 127° C. The immediate consequence is that in order to obtain a polyoxymethylene, polymerisation must be effected at a temperature less than 127° C.; this is effectively verified by the literature where whatever the catalyst employed, the authors use a temperature of from −180 to +130° C. for the production of polyoxymethylene.

With a view to avoiding the disadvantages of the processes described above, we have established that by operating under pressure, it is perfectly possible to obtain polyoxymethylenes by polymerisation at temperatures greater than 130° C. In addition, we have unexpectedly found that by using such elevated temperatures and pressures, it is possible to obtain particularly stable polymers.

According to the present invention, therefore, we provide a process for the production of polyoxymethylene, which comprises polymerising a cyclic aldehyde trimer, if desired in admixture with one or more other monomers, at a temperature above 130° C., and preferably of from 180° to 250° C., under a pressure of at least 200 atmospheres, and preferably of from 500 to 4000 atmospheres.

The polymerisation reaction can be effected under very high pressures which can be as high as 7000 atmospheres. It is not necessary to use a particular solvent and the reaction can, in fact, be carried out without any solvent other than that which may be used as the vehicle for the catalyst.

In carrying out the process according to the invention, the reasons for the production of polyoxymethylenes which are more stable than those obtained by the presently employed polymerisation conditions are not actually known. The experimental results which are summarised below suggest various interpretations which, moreover, are not mutually exclusive. It can, for example, be supposed that the fact of operating at elevated temperatures and with certain catalysts permits the development of polymerisation reactions whose mechanism is not purely ionic (as is omitted for the polymerisation of trioxan at low temperatures). It can equally be supposed that the use of elevated temperatures favours the occurrence of secondary reactions, known and unknown, which lead to an "in situ" stabilisation of the polymer.

In the process according to the invention, the catalytic system can be a Lewis acid or an amine, an organometallic compound, a hydride of phosphorus, antimony or arsenic, certain metal carbonyls, oxonium compounds of nitrogen, of sulphur or of phosphorous, a carbodiimide, sulphur, a redox catalyst, a hydroxide or oxide of alkaline earth metals, hexamine or an amino-acid.

In the case where trioxan is used as starting material, the following other catalysts can be used; sulphonic acids, perhalogenated acids, inorganic fluorides, organic compounds containing an active halogen, sulphur trioxide, oxonium salts, and diazonium fluoroborates. Ionising radiations employed in situ or previously can also be used as a means of promoting the polymerisation.

Among all these catalysts, particularly good results are obtained by using boron trifluoride, titanium tetrachloride, peracids or halogenated peracids, either alone or with the addition of a co-catalyst such as, for example, ether which forms a complex with certain of these compounds.

These various catalysts can be used in different physical states and with a view to simplifying operation of the process, catalysts are preferably employed which are liquid under the operating conditions of the process or catalysts which are soluble in inert solvents; catalysts can also be used which, associated with a specific catalyst, are capable of forming a liquid complex or one which is soluble in an inert solvent.

Compounds such as water, alcohols, acids, amides, halides, methylformate, formic acid, acetic acid and acid anhydrides can be used as adjuvants to the polymerisation catalyst and possibly act as co-catalysts, complementary thermal stabilisers or even transfer agents. Certain of these compounds are present as impurities in commercial trioxan which can be used as the starting material in the process according to the invention.

The duration of the polymerisation reaction is, in general, very short and is, of course, dependent on the catalytic system employed.

In order to establish the stability of the polymers according to the invention, we have used a test similar to that recommended in the literature (Naylor and Anderson, J. Am. Chem. Soc., 76, 3962 (1954)) for the study of the stability of conventional polyoxymethylenes. The loss in weight of the polymer at 222° C. is measured as a function of time; however, in view of the behaviour of the products of the invention, it is not necessary to take any particular precautions to systematically avoid their oxidation. For this reason, contrary to what is recommended by the above-mentioned authors, the nacelle containing the product undergoing decomposition is not provided with a very long capillary in order to prevent diffusion of atmospheric oxygen to the polymer. In view of the particular stability of the products of the invention, it is often necessary to prolong the study of their decomposition for very long periods, of the order of an hour, in order to be able to determine with sufficient precision the $K_{222}$ constant.

Polyoxymethylenes obtained by conventional processes in general have a $K_{222}$ constant of greater than 1, very often of the order of 4 to 10. Very exceptionally products have been reported having a $K_{222}$ constant of from 0.5 to 0.8. In order to understand the order of magnitude of the decomposition constant of crude polyoxymethylenes prepared by conventional methods, it can be mentioned that the products which have been described have, after being subjected to acetylation, a decomposition reaction rate constant ($K_{222}$) of less than 1% by weight, and preferably less than 0.5%.

However, as can be seen from the following examples, the polyoxymethylenes prepared by the process according to the invention have, in the crude state and before any acetylation, a decomposition rate constant which in all cases is less than 1% and is very often less than 0.5. In certain cases, polyoxymethylenes can be prepared which have a $K_{222}$ constant in the crude state of 0.065 which renders them sufficiently stable to avoid the necessity of acetylating them prior to industrial use.

The particular thermal stability of the polymers prepared according to the invention appears to arise from their molecular structure.

Molecular structure of the polyoxymethylenes according to the invention

The homopolymers of trioxan prepared according to the invention contain in addition to C—H bonds and C—O—C bonds which are characteristic of polyoxymethylenes, functions of the type $>C=O$ and, very often, —OH functions.

The existence of the $>C=O$ functions is evidenced by infra-red spectroscopy which shows in addition to the characteristic bands of normal polyoxymethylenes (C—H=2940 cm.$^{-1}$ and C—O—C from 1087 cm.$^{-1}$ to 934 cm.$^{-1}$), a band at 1725 cm.$^{-1}$.

This band is not due to a possible copolymerisation between the trioxan and carbon monoxide liberated by a secondary reaction because, according to Journal of Polymer Science, VI, No. 10, October 1963, p. 567, this would lead to a band at 1750 cm.$^{-1}$. It is also not a question of an esterification by acetic anhydride or acetic acid since, firstly, neither of these products are present in many of the experiments and, secondly, the corresponding infrared bands are situated between 1745 and 1760 cm.$^{-1}$. It is therefore thought that the polyoxymethylenes according to the invention contain a certain number of $>C=O$ functions situated in the macromolecular chain and/or at the extremities of the latter.

The homopolymers of trioxan prepared according to the invention can also contain a certain number of —OH functions. The number of —OH functions varies with the experimental conditions, in particular with the pressure and temperature of polymerisation. For polymers prepared with the aid of boron trifluoride etherate, for example, the ratio of the functions CO/OH (which can be determined by the optical densities of the spectral bands) is greater than 3, while this ratio is less than 1 for crude polyoxymethylenes prepared by known processes. However, —OH groups are not present in certain cases; thus when trioxan is polymerised in the presence of peracetic acid, the —OH groups are replaced by acetate functions whose characteristic bands are situated between 1745 and 1760 cm.$^{-1}$. In this case (and equally in the case where the polyoxymethylenes are subjected to a final acetylation) the infra-red spectrum of the products obtained shows two bands characteristic of the function $>C=O$, one between 1745 and 1760 cm.$^{-1}$ attributable to the acetic group and the other at 1725 cm.$^{-1}$ attributable to another $>C=O$ group (probably an aldehydic group).

The molecular weight and the characteristics of the polymers according to the invention can vary within wide limits and they can be controlled in the course of production by variation of the following parameters: polymerisation time, catalyst concentration, pressure, temperature, and nature and concentration of the transfer agent. These parameters can be varied individually or the different actions can be combined according to the equality of the resin which it is desired to obtain. It is normally preferred to combine these parameters in such a way as to obtain not only a molecular mass suitable for industrial applications, but also a rate of conversion which is as high as possible.

In carrying out the process according to the invention, trioxan and the cyclic trimer of paraldehyde are used as the starting material in association, if desired, with other monomers such as ethylene oxide, and 1,3,6 trioxacyclooctane, known as diethyleneglycol formaldehyde of which the formula is

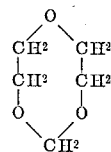

In order that the invention may be more fully understood the following examples are given by way of illustration only.

In these examples the estimation of the CO and OH groups was carried out in the following manner:

The examination was carried out on pastilles of pure polymer obtained by cold compression in a pastille mould. For each sample two or three pastilles were made in order to eliminate the risk of error. The ratio of optical densities (Do) was measured on each spectrum obtained:

for the OH group $$\frac{Do \text{ at } 2.90\mu}{Do \text{ at } 4.32\mu}$$

for the C=O group $$\frac{Do \text{ at } 5.80\mu}{Do \text{ at } 4.32\mu}$$

The band at $4.32\mu$, chosen as reference band, depends on the thickness of the pastille.

These ratios $$\frac{Do\ 2.90}{Do\ 4.32}$$

and $$\frac{Do\ 5.80}{Do\ 4.32}$$

vary in proportion to the quantities of OH and C=O groups.

EXAMPLE 1

An apparatus suitable for carrying out the process of this example is shown in FIGURE 1 of the accompanying drawings which is a diagrammatic vertical section through the apparatus. Referring to FIGURE 1, the apparatus comprises a container of variable volume consisting of a body 1 in which is positioned a slidable piston 2. The body 1 is provided with a closure 3 which is provided with an axially displaceable centre punch screw 4.

10 grams of finely divided trioxan were introduced into the body 1. The air imprisoned with the trioxan is carefully eliminated by several evacuations under vacuum followed by filling with dry nitrogen. With the aid of a syringe, 0.05 cc. of a solution of 20 g./litre of boron trifluoride in anhydrous ethyl ether were injected into the mass of trioxan. The container was then closed and sealed by screwing in the punch screw 4. The container, filled in this way, was placed in a pressure-resistant autoclave and electrically heated to raise the interior temperature to 260° C. The autoclave was closed when the container had been introduced into it and the autoclave was subjected to a pressure of 500 kg./sq. cm. of nitrogen.

The closing of the autoclave and the attainment of the above pressure required not more than 2 minutes.

The pressure was maintained for 3 minutes. The pressure was released, the autoclave was opened and the container was subjected to sudden cooling by plunging it into cold water, the whole of these operations being carried out in 1 minute 10 seconds.

It was then found that the cold piston 2 had passed to a rear position and that, after opening, the interior walls of the container were covered with a white, vitreous, hard product. This product was recovered, crushed in a mortar in the presence of acetone, filtered, and dried. 6.9 grams of a white powder were thus obtained melting at 165/173° C. and insoluble in dimethyl formamide at a temperature of 150° C. The specific viscosity measured in solution in aniline at 150° C. at a concentration of 0.25 g./100 cc., was 0.15 (35 minutes after dissolution at 150° C.).

Figure 2:
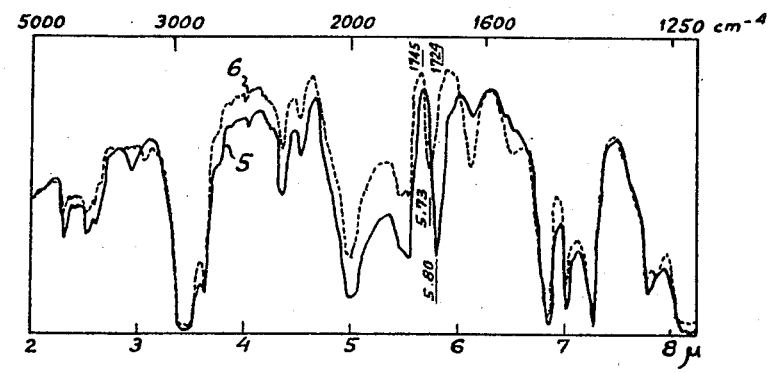

The infra-red spectrum of the polymer obtained is shown in FIGURE 2 of the accompanying drawings and is represented by the curve 5. In order to demonstrate the novelty of the product in comparison with commercial polyoxymethylenes, there is also shown in FIGURE 2, as curve 6, the spectrum of a commercial acetylated polyoxymethylene. In the spectrum of the product of this example, the optical density ratio $D^{CO}/D^{OH}$ is 7.2.

The thermal stability, $K_{222}$, of the polymer is 0.72.

EXAMPLE 2

Figure 3:
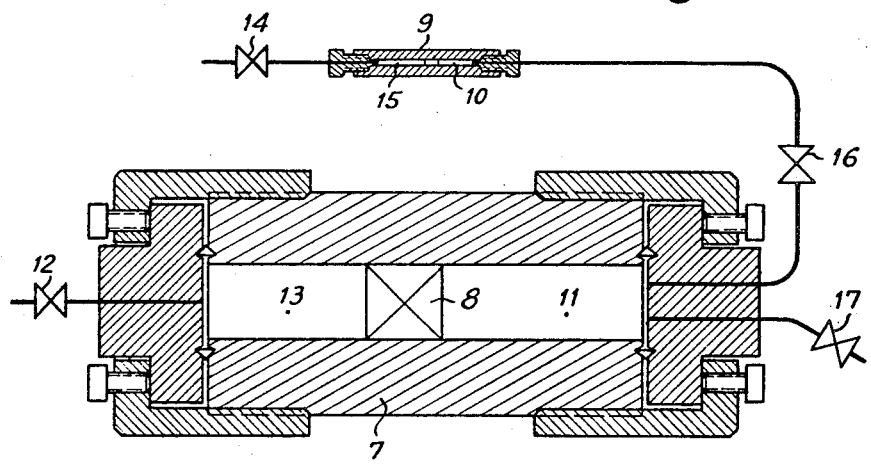

The apparatus used for carrying out the process of this example is shown diagrammatically in FIGURE 3, of the accompanying drawings. The apparatus comprises an autoclave 7 provided with a slidable sealing piston 8 and means 9 for the injection of catalyst into which were previously introduced, at 10, a solution of 10 g./litre of boron trifluoride in anhydrous ether, preferably saturated with air. 60 grams of dry finely divided trioxan were placed in the interior of the autoclave 7, at 11.

Cold nitrogen under a pressure of 700 atmospheres was introduced through a valve 12 into the autoclave at 13. While maintaining this pressure constant, the autoclave was heated to 220° C. The trioxan at 11 melted and the temperature of the assembly was in equilibrium. Cold nitrogen under a pressure of 1000 atmospheres was then introduced by the valve 14 into the space 15 of the injector 9. The valve 16 was rapidly opened and the catalyst was thus injected into the autoclave. The volume injected was 1 cc., the polymerisation took place immediately after the injection and, 60 seconds after this injection of the catalyst, the valve 17 was opened.

The pressure at 13 then tended to diminish and was immediately readjusted so that it was always in the region of 700 atmospheres.

A very viscous product came out through the valve 17 which solidified in the form of a rather ragged filament and which was allowed to fall into cold acetone. The extrusion took place slowly, the residence time of the resin under pressure at the temperature of the process increasing as the extrusion continued. For this reason, in order to obtain a homogeneous product, only the portion of the product which was first extruded (about 10 g.) was retained.

The resin obtained melted at from 168–174° C. Its specific viscosity measured in aniline at 150° C. at a concentration of 0.25 g./100 cc., was 0.307 (32 minutes after dissolution). The infra-red analysis showed a CO/OH ratio of 8.5. After finely crushing the filament obtained, a powder was formed which was heated to 222° C. under nitrogen; the thermal decomposition constant is: $K_{222}=0.35$.

When the specific viscosity of the product extruded from the autoclave after 5 minutes residence time was measured, a value of 0.05 was obtained which is substantially less than the preceding value (0.307) and this shows the value of operating with a very short lapse of time.

Figure 4:
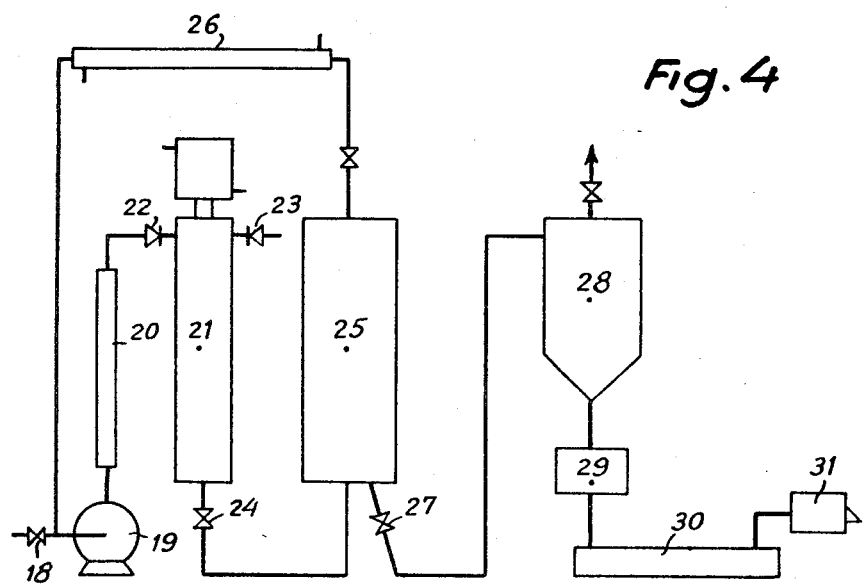

Results similar to those described above can be obtained with a continuously operating apparatus such as that which is shown diagrammatically in FIGURE 4 of the accompanying drawings.

Referring to this figure, the trioxan is melted under atmospheric pressure and introduced into the apparatus through the valve 18. The apparatus comprises a pumping device 19 and a reheater 20 which enable the trioxan introduced to be raised to the temperature and pressure desired in the reactor 21, the introduction of the trioxan being made through a valve 22.

A solution of catalyst is also introduced into the reactor 21 through a supply regulating device 23 which is regulated by the supply of trioxan introduced through the valve 22.

The polymer which is formed in the reactor 21 is passed from the latter through a valve 24 and passes at the same temperature into a separator 25 maintained at a pressure corresponding to the vapour pressure of trioxan at the temperature of the polymer. The vapour which is separated in the separator 25 is recycled to the trioxan supply through a cooler 26. The liquid polymer which leaves the separator 25 is evacuated through a valve 27 to an extrusion device comprising a reservoir 28 maintained at a pressure slightly higher than atmospheric pressure, an extruder 29 and a tank 30 for the cooling and washing of the solid resin which is then granulated at 31.

A reactor of the type shown diagrammatically in FIGURE 5 of the accompanying drawings can be used as the reactor 21.

Referring to FIGURE 5, the apparatus comprises a vertical reactor 32 including an agitation system 33 into which the trioxan is introduced at 22 and the catalyst in solution at 23. The apparatus also comprises an inlet 34 for the introduction of a co-monomer and an inlet 35 for the introduction of different adjuvants, such as stabilisers and anti-oxidants.

Separate readings of the temperature are taken at 36, 37, 38 and 39 and they enable the evolution of the temperature of the reaction mixture in the reactor to be followed. The resin leaving the reactor is evacuated at 24 and is passed on to the separation, washing and extrusion stages as shown diagrammatically in FIGURE 4.

Another type of reactor suitable for carrying out the process according to the invention is shown diagrammatically in FIGURE 6 of the accompanying drawings. The reactor comprises a number of tubes 40 into which the trioxan is introduced at 22 and the catalyst is introduced at 23. The various tubes 40 are immersed at a constant temperature. The resin leaves the reactor at 24 and is passed to a separator as described above. In this type of reactor the residence time for a given rate of supply is a function of the length and the diameter of the tubes.

EXAMPLE 3

Using the apparatus shown in FIGURE 1 and following the same procedure as in Example 1, 58 g. of trioxan were polymerised using 3 cc. of a solution of 1 g./l. of boron trifluoride in anhydrous ethyl ether.

After charging the autoclave, it was raised to a pressure of 3000 atmospheres of nitrogen, the temperature being 210° C. The pressure was maintained for 15 minutes; after decompression and opening, 30 g. of polymer having the following characteristics were recovered:

Specific viscosity _____ [1]0.02
$D^{CO}/C^{OH}$ _____ 28
$K_{222}$ _____ 0.28

[1] Determined under the same conditions as in Example 1.

EXAMPLE 4

By following the same procedure as in Example 3 using a pressure of 1500 atmospheres, a temperature of 140° C. and a polymerisation time of 5 minutes, 25 g. of polymer having the following characteristics were recovered:

Specific viscosity _____ [2]0.05
$D^{CO}/D^{OH}$ _____ 25
$K_{222}$ _____ 0.065

[2] Determined under the same conditions.

EXAMPLE 5

Apparatus in which the process of this example was carried out is shown diagrammatically in FIGURE 7 of the accompanying drawings.

Molten trioxan is introduced into the part 41 of this apparatus (a bored hole of 20 mm. diameter), the introduction being effected with an injection device 42. The volume of trioxan introduced is 16 cc. The end 43 of the bored hole 41 is maintained solidly closed by means of screw-jacks 44 and 45. A pressure of about 60 atmospheres is admitted into the part 46 of the apparatus and, taking account of the disposition of the piston 47 this pressure creates a pressure of 1500 atmospheres in the space 41.

The apparatus is heated to 200° C. and when the assembly is in equilibrium as to pressure and temperature, the catalyst is injected by means of the injector 48 and the valve 49 which is opened rapidly. The catalyst consists of a solution of 130 g./litre of titanium tetrachloride in heptane. The volume injected is 0.5 cc. At the end of 30 seconds measured from the injection of the catalyst, the screw-jacks 44 and 45 are freed. The end 43 pivots about its axis 50 and the resin which has been formed is ejected into a receiver containing cold acetone. The ejection is completed by advancing the piston 47. The discharge of the resin is effected in 8 to 10 seconds.

A product is obtained, in the acetone, in the form of irregular blocks. It is filtered without drying, crushed in a mortar, the crushed product washed in cold acetone, filtered and then dried under vacuum. 14 grams of a white powder melting at from 165 to 173° C. are obtained. Its specific viscosity, measured as described in the previous examples, is 0.240 (34 minutes after dissolution). The infra-red analysis shows a CO/OH ratio of 12. The thermal stability constant is: $K_{222}=0.48$.

The apparatus shown in FIGURE 7 can be used in a pseudo-continuous installation, the double effect piston 47 being returned to its initial position by the pressure of oil present in the space 51. In its movement, it can draw in a new charge of molten trioxan into which a determined quantity of catalyst solution is again injected. The piston 47 is forced back when the trioxan is in condition for polymerisation.

EXAMPLE 6

A commercial trioxan containing the following impurities:

Formaldehyde _____ p.p.m__ 400
Formic acid _____ p.p.m__ 200
Water _____ p.p.m__ 300
Peroxide _____ mm./kg__ 1.02 was used. This trioxan was distilled over sodium and the intermediate portion of the distillate was used; it was subjected to analysis and contained the following impurities:

P.p.m.
Formaldehyde _____ 250
Formic acid _____ 60
Water _____ 80
Peroxide _____ 0

Polymerisation of this trioxan was carried out using the apparatus shown in FIGURE 3.

With the valve 16 closed and the piston in the rear position, 25 cc. of molten trioxan was introduced under dry nitrogen through the valve 17. The valve 17 was then closed and oil compressed to 2500 atmospheres was admitted through the valve 12 into the enclosure 13. The piston 8 was thus displaced and transmitted the pressure to the trioxan. The reactor was then heated to 200° C.; the pressure was thus raised to 3500 atmospheres.

When the temperature and pressure had reached equilibrium, the valve 17 was slowly opened and the products of the reaction were extruded into cold acetone which dissolved the unpolymerised trioxan. The polymer formed, which precipitated, was filtered, washed several times in acetone and dried. The conversion rate to polyoxymethylene was 4%; the specific viscosity measured as previously described was 0.87; $K_{222}$ was 0.72.

EXAMPLE 7

The procedure desscribed in Example 6 was followed using a trioxan fraction containing the following impurities:

P.p.m.
Formaldehyde _____ 400
Formic acid _____ 20
Water _____ 150
Peroxide _____ 0

Polymerisation was effected as in Example 6 leading to the production of a polymer at a conversion rate of 3.2%. The specific viscosity of polymer, measured as before, was 0.91 and its $K_{222}$ was 0.68.

EXAMPLE 8

A trioxan fraction having, after distillation, the analysis given in Example 6 was placed in a thermostatic bath at 80° C. for 20 hours in the presence of a 250 w. ultra-violet generating lamp. Air at a rate of 5 litres/hr. was bubbled into the trioxan.

After this treatment, the trioxan contained the following impurities:

Formaldehyde _____ p.p.m__ 920
Formic acid _____ p.p.m__ 1000
Water _____ p.p.m__ 300
Peroxide _____ mm./kg__ 2.67

Polymerisation was carried out as described in Example 6 and a polymer was obtained with a conversion rate of 50%. The polymer had a specific viscosity, measured as before, of 0.52 and its $K_{222}$ was 0.70.

EXAMPLE 9

A trioxan containing the following impurities was used:

| | | |
|---|---|---|
| Formaldehyde | p.p.m | 200 |
| Formic acid | p.p.m | 20 |
| Water | p.p.m | 0 |
| Peroxide | mm./kg | 0.26 |

Three experiments were carried out with this trioxan, using the polymerisation procedure described in Example 6.

(a) Using this trioxan as in Example 6, a polymer having a specific viscosity of 0.97 and a $K_{222}$ of 0.65 was obtained with a conversion rate of 8%.

(b) 1 cc. of a 40% solution of peracetic acid in acetic acid was injected into the trioxan and the rest of the experiment was carried out as before. A polymer having a specific viscosity of 0.23 and a $K_{222}$ of 0.32 was obtained with a conversion rate of 64%.

(c) 1 cc. of acetic acid (without peracetic acid) was injected into the trioxan and the rest of the experiment was carried out as before. A polymer having a specific viscosity of 0.67 and a $K_{222}$ of 0.59 was obtained with a conversion rate of 6%.

The various examples given above show that the polymerisation must be effected at a temperature such that the trioxan is molten under the pressure used.

The characteristics of the polymer obtained, as well as the polymerization yield, are a function of the pressure and maximum temperature attained during the process.

The influence of the pressure by itself has been investigated and it has been observed that at a pressure less than 200 atmospheres, the polymerisation yield and the specific viscosity of the polymer are very low.

Comparative experiments have been carried out to determine the variation of the conversion rate and the specific viscosity of the polymer obtained, as a function of the pressure. These experiments were carried out with the same trioxan which contained the following impurities:

| | | |
|---|---|---|
| Formaldehyde | p.p.m | 300 |
| Formic acid | p.p.m | 100 |
| Peroxide | mm./kg | 0.40 |

The maximum temperature was 180° C. and the polymerisation conditions were as in Example 6. The following results were obtained:

| Pressure, kg./cm.² | Conversion rate, percent | Specific viscosity |
|---|---|---|
| 200 | 3 | 0.15 |
| 500 | 5 | 0.22 |
| 1,500 | 8 | 0.34 |
| 3,000 | 17 | 0.44 |
| 4,000 | 22 | 0.58 |

EXAMPLE 10

10 grams of an equimolecular mixture of trioxan and 1,3,6-trioxacyclooctane and 0.05 cc. of a solution of 20 g./litre of boron trifluoride in anhydrous ethyl ether were introduced into the apparatus described in Example 1. The autoclave was heated to 200° C. and the pressure was raised to 3000 atmospheres. The pressure was maintained for 3 minutes. After release of the pressure and cooling, a hard granular white mass was obtained which, after crushing, washing with acetone and drying at 60° C. under vacuum, gave a white crystalline powder having the following properties:

| | | |
|---|---|---|
| Melting point | ° C | 168/171 |
| Insolubility in dimethylformamide specific viscosity in aniline | | [3]0.18 |
| C=O/OH | | 5.3 |
| $K_{222}$ | | 0.06 |

[3] 32 minutes after dissolution.

This product was formed into a resistant film by mixing a part of the product with anti-oxidants and heating the mixture under pressure between two plates of glass.

We claim:

1. In a process for polymerizing a cyclic aldehyde compound to form a polyoxymethylene resin by heating the trimer in the presence of a catalyst, the improvement which comprises heating a molten charge consisting essentially of the compound at a temperature greater than about 130° C. and at a pressure of at least 200 atmospheres, the compound being selected from trioxane, paraldehyde and 1,3,6-trioxacyclooctane and mixtures thereof.

2. A process as defined in claim 1 wherein the temperature is from about 180° C. to about 250° C.

3. A process as defined in claim 1 wherein the pressure is from about 500 to about 4000 atmospheres.

4. A process as defined in claim 1 wherein the trimer is trioxane.

5. A process as defined in claim 1 wherein the temperature is from about 180° C. to about 250° C., the pressure is from about 500 to about 4000 atmospheres and the trimer is trioxane.

References Cited

UNITED STATES PATENTS

| | | | |
|---|---|---|---|
| 2,373,561 | 4/1945 | Hanford | 260—67 |
| 2,425,638 | 8/1947 | Peterson | 260—73 |
| 3,194,788 | 7/1965 | Kullmar et al. | 260—67 |
| 3,272,780 | 9/1966 | Wilson et al. | 260—73 |

OTHER REFERENCES

Furukawa et al.: Polymerization of Aldehydes and Oxides (1963), Interscience Publishers, John Wiley and Sons, New York, pp. 45–48.

WILLIAM H. SHORT, *Primary Examiner.*

L. M. PHYNES, *Assistant Examiner.*

UNITED STATES PATENT OFFICE
CERTIFICATE OF CORRECTION

Patent No. 3,397,182                                August 13, 1968

Robert Charles et al.

It is certified that error appears in the above identified patent and that said Letters Patent are hereby corrected as shown below:

Column 4, line 48, after "of" insert -- acetaldehyde --. Column 7, line 29 "$C^{OH}$" should read -- $D^{OH}$ --. Column 8, lines 20 and 75, and column 9, lines 11 and 47, "mm./kg" should read -- mM/kg --.

Signed and sealed this 30th day of December 1969.

(SEAL)
Attest:

Edward M. Fletcher, Jr.                         WILLIAM E. SCHUYLER, JR.

Attesting Officer                                       Commissioner of Patents